United States Patent
Byun et al.

(10) Patent No.: US 10,128,998 B2
(45) Date of Patent: Nov. 13, 2018

(54) METHOD AND DEVICE FOR PERFORMING CHANNEL ESTIMATION IN WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Eunjong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 94 days.

(21) Appl. No.: 15/286,175

(22) Filed: Oct. 5, 2016

(65) Prior Publication Data

US 2017/0099127 A1    Apr. 6, 2017

Related U.S. Application Data

(60) Provisional application No. 62/237,590, filed on Oct. 6, 2015.

(51) Int. Cl.
*H04L 5/00* (2006.01)
*H04L 1/00* (2006.01)
*H04L 25/02* (2006.01)

(52) U.S. Cl.
CPC .......... *H04L 5/0051* (2013.01); *H04L 5/0053* (2013.01); *H04L 1/0047* (2013.01); *H04L 25/02* (2013.01); *H04L 25/0202* (2013.01)

(58) Field of Classification Search
CPC ..... H04L 5/00; H04L 5/0051; H04L 25/0202; H04L 25/0204; H04L 25/0206; H04L 1/0047; H04L 2025/03783; H04L 2025/03796; H04W 72/04;
(Continued)

(56) References Cited

U.S. PATENT DOCUMENTS 8,179,853 B2 * 5/2012 Hu ................... H04W 72/1247
370/329
8,693,445 B2 * 4/2014 Hole ................. H04W 72/0446
370/329
(Continued)

FOREIGN PATENT DOCUMENTS

WO    Wo2017/056020    * 9/2016

*Primary Examiner* — Warner Wong
(74) *Attorney, Agent, or Firm* — Lee Hong Degerman Kang & Waimey

(57) ABSTRACT

Provided are a method and device for performing channel estimation in a wireless communication system. Specifically, user equipment receives a control channel in the first symbol of a plurality of symbols received for a short TTI (sTTI) set to be shorter than a TTI. The user equipment receives a data channel scheduled by the control channel in the remaining symbols other than the first symbol of the plurality of symbols received in the sTTI. The user equipment receives a user equipment (UE)-specific reference signal having the same frequency resource as a first cell-specific reference signal received in the TTI in the first symbol. The first cell-specific reference signal is received subsequent to the UE-specific reference signal, and the UE-specific reference signal is received in the sTTI. The user equipment decodes the control channel or the data channel using the UE-specific reference signal.

18 Claims, 12 Drawing Sheets

(58) Field of Classification Search
CPC ........... H04W 72/0446; H04W 72/042; H04W 72/0453; H04W 4/20
See application file for complete search history.

(56) References Cited

U.S. PATENT DOCUMENTS

| | | | |
|---|---|---|---|
| 8,995,422 B2* | 3/2015 | Aghili | H04L 1/0025 370/349 |
| 2009/0213750 A1* | 8/2009 | Gorokhov | H04W 72/1231 370/253 |
| 2013/0114525 A1* | 5/2013 | Ahmadi | H04L 5/0053 370/329 |
| 2016/0065341 A1* | 3/2016 | Yoo | H04W 72/0446 370/336 |
| 2016/0100395 A1* | 4/2016 | Xu | H04L 1/1607 370/336 |
| 2016/0143008 A1* | 5/2016 | Lee | H04W 72/042 370/336 |
| 2016/0143030 A1* | 5/2016 | Lee | H04L 5/00 370/329 |
| 2016/0249329 A1* | 8/2016 | Au | H04W 48/00 |
| 2016/0338046 A1* | 11/2016 | Chen | H04L 5/0048 |
| 2016/0352482 A1* | 12/2016 | Sun | H04L 5/0048 |
| 2017/0105233 A1* | 4/2017 | Zhang | H04W 16/14 |
| 2017/0111923 A1* | 4/2017 | Nogami | H04W 72/1263 |
| 2017/0289970 A1* | 10/2017 | Yang | H04W 72/042 |
| 2018/0167980 A1* | 6/2018 | Shi | H04W 72/02 |
| 2018/0176912 A1* | 6/2018 | Li | H04W 72/04 |
| 2018/0176938 A1* | 6/2018 | Shao | H04W 72/0493 |

* cited by examiner

METHOD AND DEVICE FOR PERFORMING CHANNEL ESTIMATION IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/237,590, filed on Oct. 6, 2015, the contents of which are all hereby incorporated by reference herein in their entirety.

BACKGROUND OF THE INVENTION

Field of the Invention

This specification relates to wireless communication and, more particularly, to a method for performing channel estimation in a wireless communication system and a device using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

Technical Objects

This specification provides a method for performing channel estimation in a wireless communication system and a device using the same.

Technical Solutions

This specification proposes a method for performing channel estimation in a wireless communication system.

First, terms are summarized below. In this specification, a wireless communication system may be a system for performing communication using a subframe transmitted in a TTI. An sTTI is the time unit of resources that is temporally set to be shorter than that of a TTI. The wireless communication system may be a system in which a TTI and an sTTI coexist. Accordingly, a first cell-specific reference signal and a second cell-specific reference signal are received in a TTI, and a UE-specific reference signal are received in an sTTI. A control channel may become an sPDCCH received in the control region of an sTTI. A data channel may become an sPDSCH received in the data region of an sTTI. A symbol may include an OFDM symbol.

UE receives a control channel in the first symbol of a plurality of symbols received for an sTTI. The first symbol may become a short control region (sCR), that is, the control region of the sTTI.

The UE receives a data channel scheduled by the control channel in the remaining symbols other than the first symbol of the plurality of symbols received for the sTTI. The remaining symbols may become a data region other than the control region of the plurality of symbols received for the sTTI.

The UE receives a UE-specific reference signal having the same frequency resources as a first cell-specific reference signal in the first symbol. The first cell-specific reference signal is received subsequent to a UE-specific reference signal. That is, the deployment of the UE-specific reference signal received in an sTTI may be changed by taking into consideration the first cell-specific reference signal received in a TTI.

The reason why the frequency resource of the UE-specific reference signal is the same as that of the first cell-specific reference signal received subsequent to the UE-specific reference signal is that a relation with a second cell-specific reference signal received prior to the UE-specific reference signal is also taken into consideration. That is, the second cell-specific reference signal is received prior to the sTTI in which the UE-specific reference signal is received. The UE-specific reference signal performs channel estimation on the control channel or the data channel within the sTTI through interpolation with the second cell-specific reference signal. That is, the optimum location of the UE-specific reference signal for performing interpolation with the second cell-specific reference signal that is previously received may be a location having the same frequency resources as that of the first cell-specific reference signal that is to be subsequently received. In this case, the second cell-specific reference signal may have a frequency resource different from that of the UE-specific reference signal based on the execution of a diagonal direction pattern.

Furthermore, the UE-specific reference signal is not received in symbols in which the first cell-specific reference signal and the second cell-specific reference signal are received. The reason for this is to minimize performance deterioration which may occur when channel estimation using the UE-specific reference signal is performed due to interference generated by the cell-specific reference signal of a neighbor cell. Furthermore, the reason for this is to constantly maintain the number of REs for the control channel of the first OFDM symbol within the sTTI.

Furthermore, multiple input multiple output (MIMO) precoding is not applied to the first cell-specific reference signal, the second cell-specific reference signal, and the UE-specific reference signal. MIMO precoding is not applied to the UE-specific reference signal because MIMO precoding is not applied to a CRS. If CRS MIMO precoding is applied, MIMO precoding may also be applied to the UE-specific reference signal.

Furthermore, transmission power for the UE-specific reference signal is the same as that for the data channel (or data).

Furthermore, if the UE-specific reference signal is disposed in resource elements according to a first antenna port, resource elements in which the UE-specific reference signal disposed according to a second antenna port is received may be set as zero-power. That is, a signal is not transmit in a resource element in which the UE-specific reference signal of another antenna port is transmitted.

The UE decodes the control channel or the data channel using the UE-specific reference signal. This is not limited to a specific channel transmitted within the sTTI, but includes all of channels transmitted within the sTTI.

Furthermore, this specification proposes a device for performing channel estimation in a wireless communication system.

First, terms are summarized below. In this specification, a wireless communication system may be a system for performing communication using a subframe transmitted in a TTI. An sTTI is the time unit of resources that is temporally set to be shorter than that of a TTI. The wireless communication system may be a system in which a TTI and an sTTI coexist. Accordingly, a first cell-specific reference signal and a second cell-specific reference signal are received in a TTI, and a UE-specific reference signal are received in an sTTI. A control channel may become an sPDCCH received in the control region of an sTTI. A data channel may become an sPDSCH received in the data region of an sTTI. A symbol may include an OFDM symbol.

A device includes a radio frequency (RF) unit which transmits and receives a radio signal and a processor connected to the RF unit. The processor receives a control channel in the first symbol of a plurality of symbols received for an sTTI, and receives a data channel scheduled by the control channel in the remaining symbols other than the first symbol of the plurality of symbols received for the sTTI. The processor of UE receives a UE-specific reference signal having the same frequency resources as a first cell-specific reference signal in the first symbol. The first cell-specific reference signal is received subsequent to the UE-specific reference signal. The processor decodes the control channel or a data channel using the UE-specific reference signal.

Effects of the Invention

The proposed method has advantages in that it does not generate additional latency attributable to channel estimation while maintaining or improving the accuracy of channel estimation.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
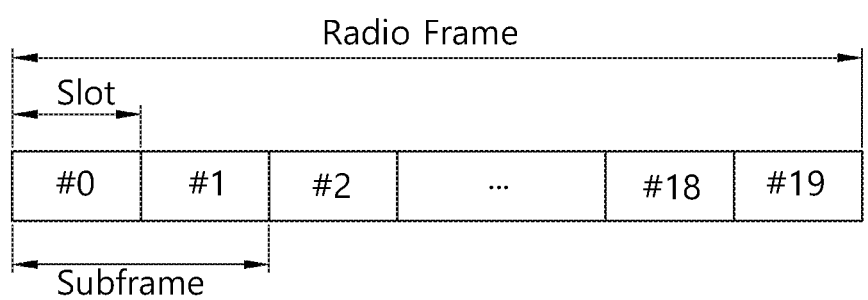
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
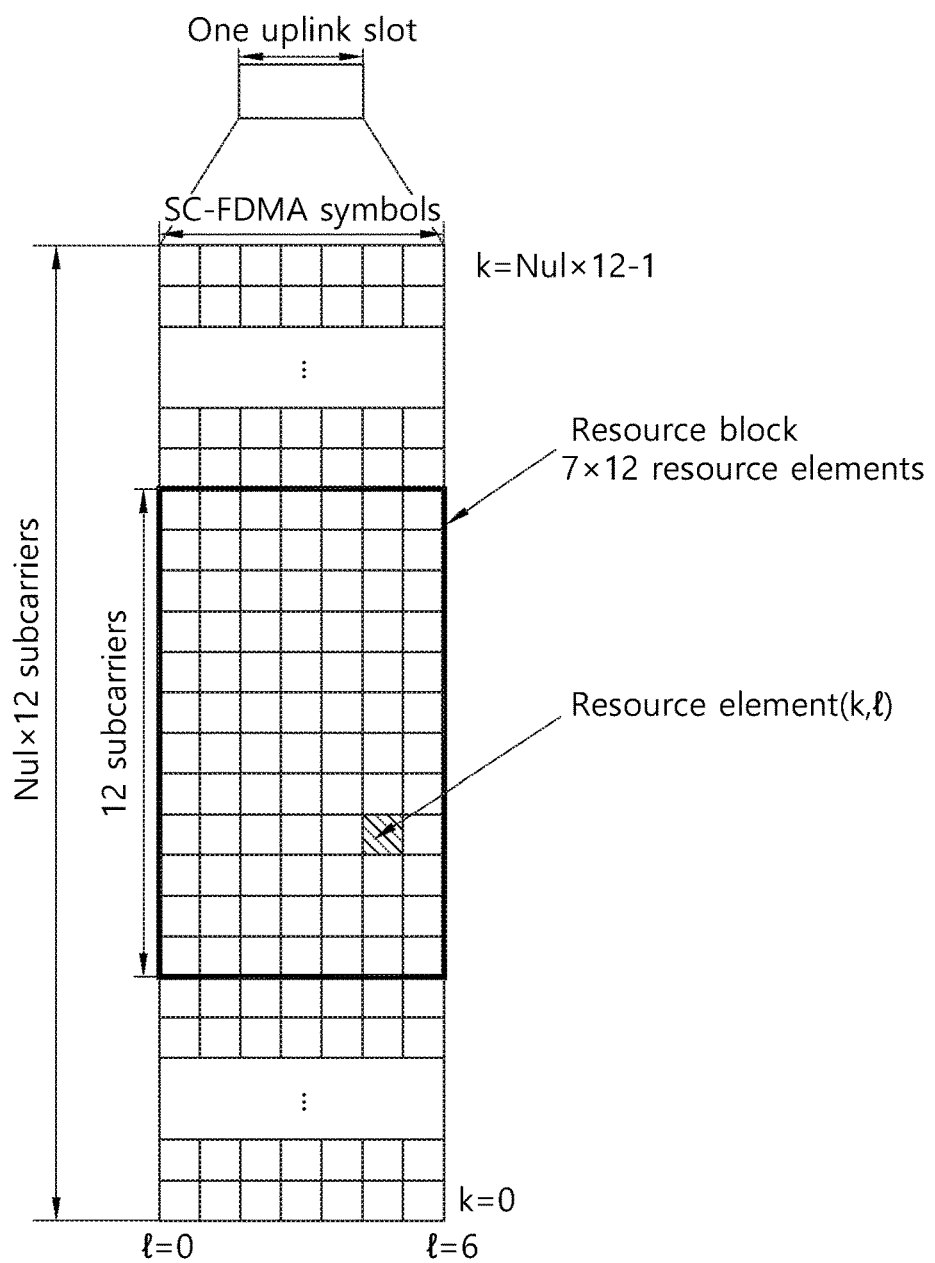
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
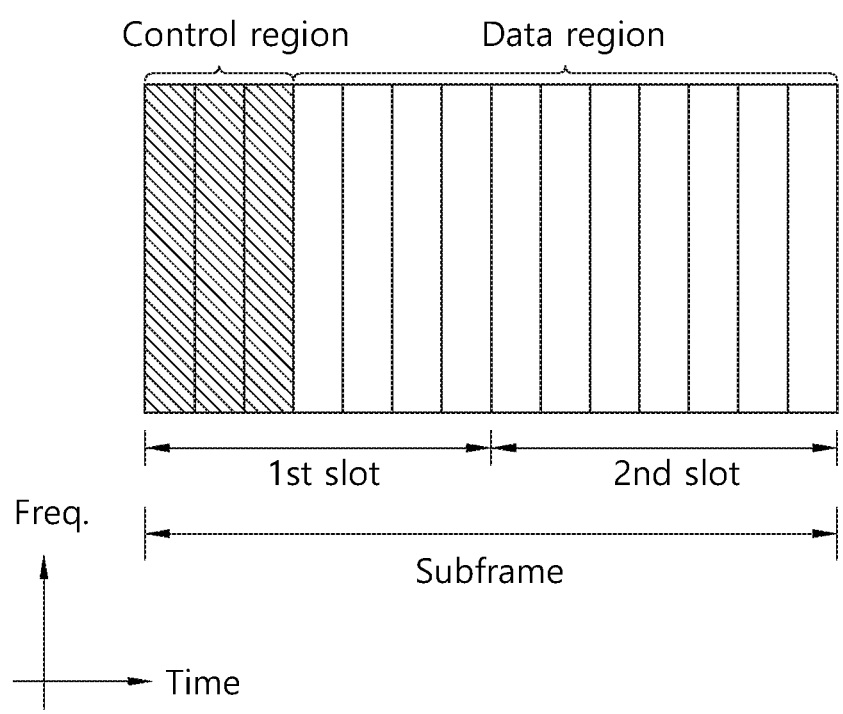
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
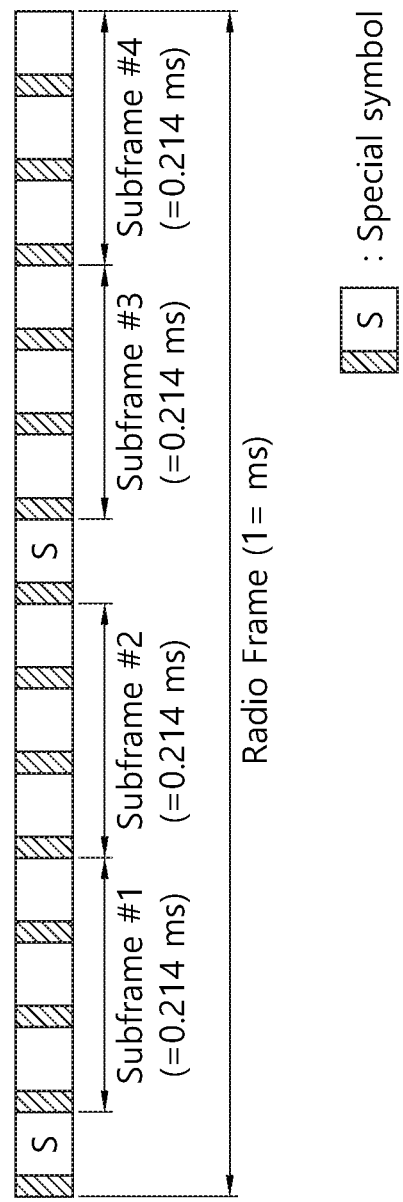
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
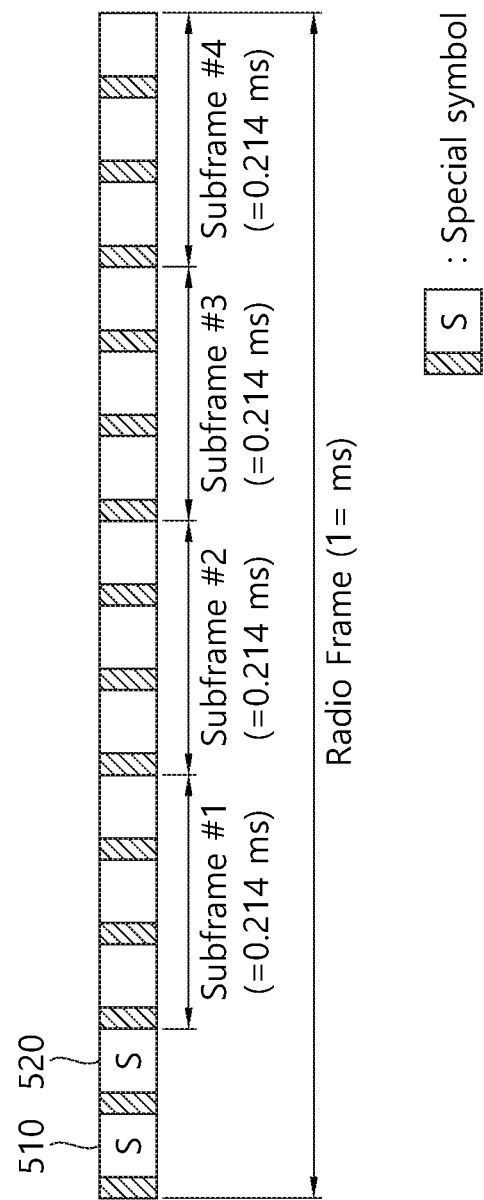
FIG. 5 shows an example of the structure of a radio frame in which special symbols have been contiguously disposed at the front part of the radio frame.
Figure 6:
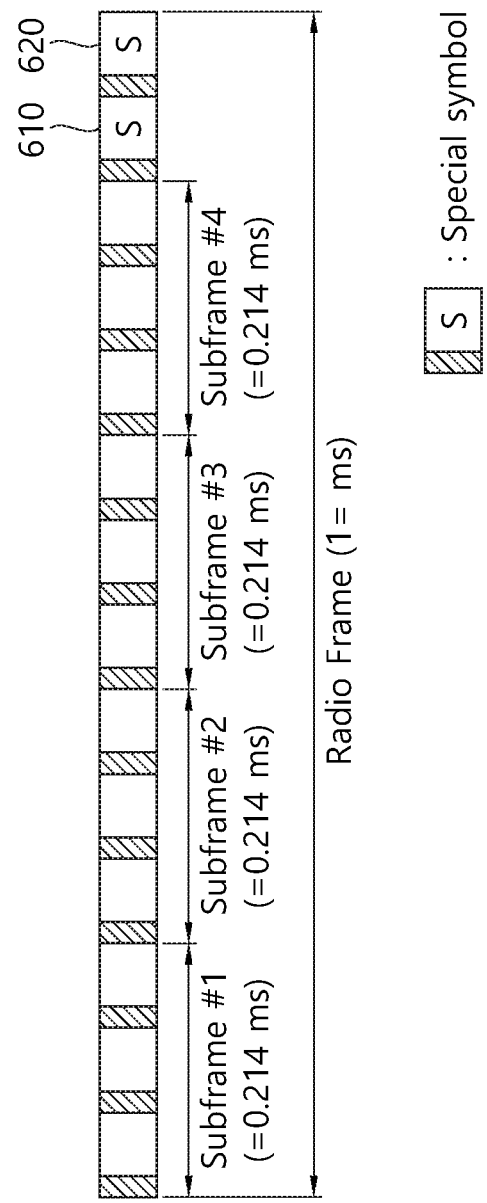
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH (s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

An object of a next-generation wireless communication system is to satisfy user plane latency of 1 ms in order to provide a low latency service. The user plane latency includes an encoding time and a decoding time in addition to the length of the existing TTI. User plane latency in a 3GPP LTE system is about 4.8 ms (an encoding time=a decoding time=1.5 ms, the length of the existing TTI=1 ms, and a target BLER=10%).

In this case, if a short TTI (sTTI) reduced from the existing TTI becomes the length of one to three OFDM symbols, user plane latency of 1 ms may be achieved. The sTTI may correspond to the length of a time that has been temporally more shortened than that of the existing TTI. That is, in order to achieve user plane latency of 1 ms the length of an sTTI needs to be three OFDM symbols or less. If user plane latency is to become 1 ms or less, the existing TTI needs to be about 1/4.8=0.21 ms. If the sTTI has the length of four or more OFDM symbols, user plane latency of 1 ms cannot be achieved. The reason for this is that the sTTI becomes 0.28 ms or more from four OFDM symbols or more. In this case, it is assumed that the encoding/decoding time decreases in proportion to a shortened TTI.

This specification proposes the deployment of resources in a situation in which the existing TTI and the sTTI coexist. As in the existing TTI, a plurality of OFDM symbols within an sTTI may be divided into a control region and a data region. The control region of the sTTI may be called a short control region (sCR). In the sCR, a short PDCCH (sPDCCH), that is, a dedicated control channel of a corresponding sTTI may be transmitted. In general, an sCR may correspond to the first OFDM symbol of a plurality of OFDM symbols within an sTTI. Accordingly, the data region of the sTTI may include the remaining OFDM symbols other than the first OFDM symbol of the plurality of OFDM symbols within the sTTI. In the data region of the sTTI, a short PDSCH (sPDSCH), that is, a dedicated data channel of a corresponding sTTI scheduled by an sPDCCH, may be transmitted.

A reference signal (RS) is described below.

When a packet is transmitted in a wireless communication system, a signal may be distorted in the transmission process because the packet is transmitted through a radio channel. The distortion of the received signal needs to be corrected using channel information so that the reception side can correctly receive the distorted signal. In order to be aware of the channel information, a method for checking the channel information with the degree in which a signal known to both the transmission side and the reception side is distorted when it is received through the radio channel in such a manner that both the transmission side and the reception side transmit the signal is chiefly used. The signal is called a pilot signal or reference signal.

If data is transmitted and received using a multiple antenna, a correct signal may be received only when a channel situation between each transmission antenna and each reception antenna is known. Accordingly, a separate reference signal may be present in each transmission antenna.

A downlink reference signal includes a common reference signal (CRS) shared by all of pieces of UE within a cell and a dedicated reference signal (DRS) for only specific UE. Information for channel estimation and demodulation may be provided by such reference signals.

The reception side (i.e., UE) may estimate the state of a channel from a CRS, and may feed an indicator related to channel quality, such as a channel quality indicator (CQI), a precoding matrix index (PMI) and/or a rank indicator (RI), back to the transmission side (e.g., a BS). The CRS may also be called a cell-specific reference signal. Alternatively, an RS related to the feedback of channel state information (CSI), such as a CQI/PMI/RI, may be separately defined as a CSI-RS.

If data on a PDSCH needs to be demodulated, a dedicated reference signal may be transmitted through a corresponding RE. UE may receive only the presence of a dedicated reference signal from a higher layer, and may be aware that the dedicated reference signal is valid only if a corresponding PDSCH has been mapped. The dedicated reference signal may be called a UE-specific reference signal or a demodulation reference signal (DMRS). Hereinafter, it is assumed that a CRS is a cell-specific reference signal and a DRS is a UE-specific reference signal, for the unity of terms.

A CRS is described in detail below.

A CRS is used to estimate a channel at a physical antenna stage and is a reference signal that may be in common received by all of pieces of UEs within a cell. The CRS is distributed to the entire band. The CRS may be used to only obtain channel state information (CSI) and to demodulate data.

A CRS is defined in various forms depending on an antenna configuration of the transmission side (e.g., a BS). A 3GPP LTE (e.g., release-8) system supports various antenna configurations. The downlink signal transmission side (e.g., a BS) has three types of antenna configurations, such as a single antenna, a 2-transmission antenna, and a 4-transmission antenna. If a BS performs single antenna transmission, a reference signal for a single antenna port is disposed. If a BS performs 2-antenna transmission, reference signals for two antenna ports are disposed. If a BS performs 2-antenna transmission, reference signals for two antenna ports are disposed in accordance with a time division multiplexing (TDM) method and/or a frequency division multiplexing (FDM) method. That is, reference signals for two antenna ports may be disposed in different time resources and/or different frequency resources so that they are distinguished from each other. Furthermore, if a BS performs four-antenna transmission, reference signals for four antenna ports are disposed in accordance with a TDM/FDM method. Channel information estimated by the downlink signal reception side (i.e., UE) through a CRS may be used to demodulate data transmitted in accordance with a transmission scheme, such as single antenna transmission, transmit diversity, closed-loop spatial multiplexing, open-loop spatial multiplexing and/or multiple (MU)-multiple input multiple output (MIMO).

If multiple antennas are supported, when a specific antenna port transmits a reference signal, a reference signal may be transmitted at the location of a resource element (RE) designated based on a reference signal pattern and any signal may not be transmitted at the location of a resource element (RE) designated for another antenna port.

A DRS is described in detail below.

A DRS (or UE-specific reference signal) is a reference signal used for data demodulation, and enables an equivalent channel in which precoding weight transmitted in each transmission antenna when specific UE receives a reference signal and a transport channel have been combined to be estimated because the precoding weight used by the UE is used in the reference signal without any change when multiple antenna transmission is performed.

A channel estimation method using a reference signal in an sTTI structure is described below.

Figure 7:
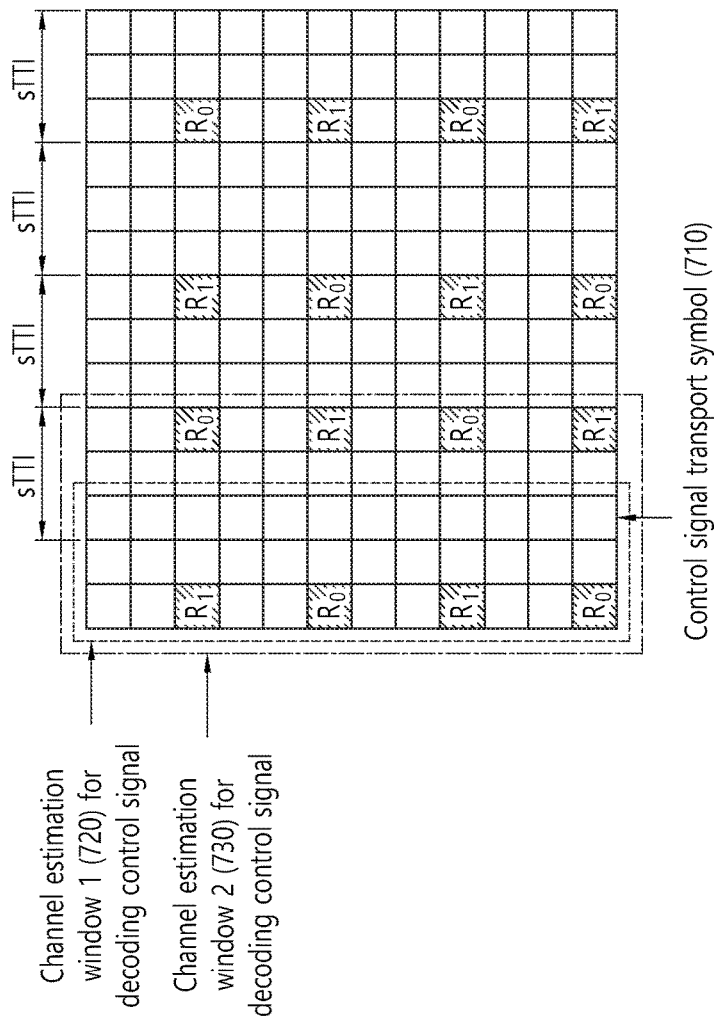
FIG. 7 shows an example of a channel estimation window for the decoding of a control signal.

FIG. 7 shows an example of a channel estimation window for the decoding of a control signal.

If the sTTI structure is applied to the existing LTE system, the channel estimation of an sTTI may be performed using the CRS of the existing LTE system without transmitting an additional UE-specific reference signal. In an sTTI in which a CRS is not transmitted, the accuracy of channel estimation is reduced or additional latency may be generated.

FIG. 7 shows a disposition relation between sTTI structures and CRSs if an sTTI structure having three OFDM symbols is applied to the existing LTE band. If the control signal of a first sTTI is transmitted in a first OFDM symbol 710, in order to decode the control signal, UE may perform channel estimation on a portion corresponding to the first OFDM symbol 710. In order for additional latency attributable to a reference signal to be not generated, the UE may perform channel estimation by taking into consideration only previously received CRSs because a CRS is not transmitted in the first OFDM symbol 710 of the first sTTI. That is, in a channel estimation window 1 720 for decoding the control signal, channel estimation is performed by taking into consideration only CRSs previously received earlier than the control signal. In this case, there is a disadvantage in that channel estimation performance is deteriorated because interpolation between reference signals is not performed in the channel estimation window 1 720. In contrast, in a channel estimation window 2 730, CRSs received in an OFDM symbol subsequent to the control signal are received and channel estimation is performed. In accordance with the channel estimation window 2 730, the accuracy of channel estimation is improved because interpolation between a CRS received in a previous OFDM symbol and a CRS received in a subsequent OFDM symbol can be performed. However, there is a disadvantage in that latency taken to decode the control signal is increased because up to a CRS received in the subsequent OFDM symbol is received.

Accordingly, this specification provides a method for disposing a reference signal and performing channel estimation in order to stably provide a low latency service even in a high-speed moving body in which a channel is rapidly changed. A method for disposing reference signals in this specification has the following characteristics.

1. Basically, a reference signal is disposed so that a receiving stage can perform channel estimation without waiting for up to a reference signal received after a point of time at which the reception of a control signal or data signal has been completed.

1) In an sTTI structure having three OFDM symbols, in order to achieve user plane latency of 1 ms, a control signal is transmitted only in the first OFDM symbol of the sTTI. Accordingly, a reference signal is transmitted in the first OFDM symbol of the sTTI.

2) In an sTTI structure having two OFDM symbols, user plane latency of 1 ms may be achieved although a control signal is transmitted up to the second OFDM symbol of an sTTI. Accordingly, a reference signal is transmitted in the first or second OFDM symbol of the sTTI. In an sTTI structure having two OFDM symbols, if a control signal is transmitted only in the first OFDM symbol of an sTTI, a reference signal is transmitted in the first OFDM symbol of the sTTI.

2. The receiving stage transmits a UE-specific reference signal in a pattern similar to that of a CRS so that channel estimation can be performed using both the CRS transmitted in a TTI and the UE-specific reference signal transmitted in an sTTI. Detailed characteristics of the similar pattern are described below.

1) Multiple input multiple output (MIMO) precoding is not applied to a UE-specific reference signal. MIMO precoding is not also applied to the UE-specific reference signal because MIMO precoding is not applied to a CRS. In this case, if CRS MIMO precoding is applied, MIMO precoding may also be applied to the UE-specific reference signal.

2) A UE-specific reference signal has the same transmission power as common data.

3) A UE-specific reference signal is not transmitted in an OFDM symbol in which a CRS is transmitted. The reason for this is to minimize performance deterioration which may occur due to interference generated by the CRS of a neighbor cell when channel estimation using the UE-specific reference signal is performed. Furthermore, the reason for this to constantly maintain the number of REs for the control signal of a first OFDM symbol in an sTTI structure having three OFDM symbols.

4) The location of a subcarrier in which a UE-specific reference signal is transmitted is the same as that of a subcarrier of a CRS to be subsequently transmitted. That is, the UE-specific reference signal may be said to have the same frequency band as the CRS to be subsequently transmitted. The location of a subcarrier in which the UE-specific reference signal is transmitted is the best location at which interpolation with a CRS transmitted prior to the UE-specific reference signal can be performed. That is, the UE-specific reference signal may be disposed at the location that is furthermost from a previously transmitted CRS and closest to a CRS to be subsequently transmitted. The disposition of a UE-specific reference signal is different depending on a cell ID as in a CRS because the location of the UE-specific reference signal is changed depending on the location of a CRS.

5) Any signal is not transmitted in an RE in which the UE-specific reference signal of another antenna port is transmitted. That is, although the UE-specific reference signal of an antenna port 1 is transmitted, any signal is not transmitted in an RE in which the UE-specific reference signal of an antenna port 2 is transmitted. That is, an RE in which the UE-specific reference signal of another antenna port is transmitted may be said to be configured as zero-power or punctured.

A detailed method for disposing reference signals in an sTTI structure having three OFDM symbols and an sTTI structure having two OFDM symbols is described below. A basic notation complies with the definition of 3GPP TS36.211. Furthermore, when a UE-specific reference signal is transmitted within an sTTI, a reference sequence complies with the sequence of TS36.211.

Figure 8:
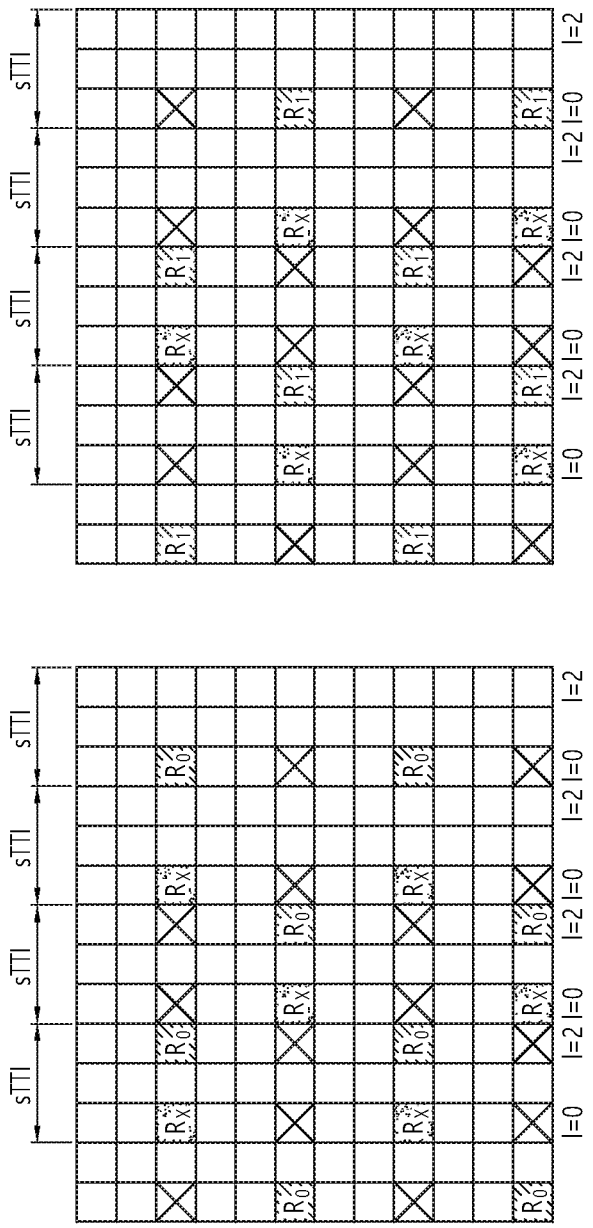
FIG. 8 shows an example of the UE-specific reference signal of an sTTI structure having three OFDM symbols.

FIG. 8 shows an example of the UE-specific reference signal of an sTTI structure having three OFDM symbols.

In the sTTI structure having three OFDM symbols, a resource mapping method for a UE-specific reference signal is as follows.

$$a_{k,l}^{(p)} = r(2 \cdot n_{PRB} + m') \quad \text{Equation 1}$$

Parameters used in Equation 1 are as follows.

$$k = N_{SC}^{RB} \cdot n_{PRB} + 6 \cdot m' + (v + v_{shift}) \bmod 6 \quad \text{Equation 2}$$

$$v = \begin{cases} 0 & \text{if } p = 0 \text{ and } n_{sTTI} = 1 \\ 3 & \text{if } p = 0 \text{ and } n_{sTTI} = 0, 2 \\ 0 & \text{if } p = 1 \text{ and } n_{sTTI} = 0, 2 \\ 3 & \text{if } p = 1 \text{ and } n_{sTTI} = 1 \\ \text{Null} & \text{if } n_{sTTI} = 3 \end{cases}$$

$$m' = 0, 1$$

$$l = \begin{cases} 0 & \text{if } n_{sTTI} = 0, 1, 2 \\ \text{Null} & \text{if } n_{sTTI} = 3 \end{cases}$$

In Equation 2, "$n_{sTTI}$=0, 1, 2 or 3" refers to the index of an sTTI within a subframe. "l=0, 1 or 2" refers to the index of an OFDM symbol within the sTTI. K is the index of a subcarrier. p is the index of an antenna port. mod means modular operation. In a frequency domain, the location of a reference signal depends on a value $V_{shift}$. The value $V_{shift}$ depends on a cell ID, and thus the location of the reference signal has a different frequency shift value in each cell.

FIG. 8 shows a form in which UE-specific reference signals are disposed according to Equation 1 and Equation 2. A figure on the left side of FIG. 8 shows the disposition of a CRS and a UE-specific reference signal if an antenna port is 0. A figure on the right side of FIG. 8 shows the disposition of a CRS and a UE-specific reference signal if an antenna port is 1.

An embodiment in which reference signals according to FIG. 8 are disposed and channel estimation is performed is described in detail below.

First, terms are summarized below. In this specification, a wireless communication system may be a system which performs communication using a subframe transmitted in a TTI. An sTTI is the time unit of resources temporally set to be shorter than that of a TTI. The wireless communication system may be a system in which a TTI and an sTTI coexist. Accordingly, a first cell-specific reference signal and a second cell-specific reference signal are received in a TTI, and a UE-specific reference signal is received in an sTTI. An sPDCCH received in the control region of an sTTI may become a control channel. An sPDSCH received in the data region of the sTTI may become a data channel. A symbol may include an OFDM symbol. A control signal may correspond to a control channel.

UE receives a control channel the first symbol of a plurality of symbols received for an sTTI. The first symbol may become a short Control Region (sCR), that is, the control region of the sTTI.

The UE receives a data channel scheduled by a control channel in the remaining symbols other than the first symbol of the plurality of symbols received for the sTTI. The remaining symbols may become a data region other than the control region of the plurality of symbols received for the sTTI.

The UE receives a UE-specific reference signal having the same frequency resources as a first cell-specific reference signal in the first symbol. The first cell-specific reference signal is received subsequent to the UE-specific reference signal. That is, the disposition of the UE-specific reference signal received in an sTTI may be different by taking into consideration the first cell-specific reference signal received in a TTI.

The reason why the frequency resource of the UE-specific reference signal is the same as that of the first cell-specific reference signal received subsequent to the UE-specific reference signal is that a relation with a second cell-specific reference signal received prior to the UE-specific reference signal is also taken into consideration. The UE-specific reference signal performs channel estimation on the control channel or the data channel within the sTTI through interpolation with the second cell-specific reference signal. That is, the optimum location of the UE-specific reference signal for performing interpolation with the previously received second cell-specific reference signal may be a location having the same frequency resources as that of the first cell-specific reference signal to be subsequently received. In this case, the second cell-specific reference signal may have a frequency resource different from that of the UE-specific reference signal on the basis that a diagonal direction pattern is performed.

Furthermore, the UE-specific reference signal is not received in symbols in which the first cell-specific reference signal and the second cell-specific reference signal are received. The reason for this is to minimize performance deterioration which may occur when channel estimation using the UE-specific reference signal is performed due to interference generated by the cell-specific reference signal of a neighbor cell. Furthermore, the reason for this is to constantly maintain the number of REs for the control channel of the first OFDM symbol within the sTTI.

Furthermore, multiple input multiple output (MIMO) precoding is not applied to the first cell-specific reference signal, the second cell-specific reference signal, and the UE-specific reference signal. MIMO precoding is not applied to the UE-specific reference signal because MIMO precoding is not applied to a CRS. If CRS MIMO precoding is applied, MIMO precoding may also be applied to the UE-specific reference signal.

Furthermore, transmission power for the UE-specific reference signal is the same as that for the data channel (or data).

Furthermore, if the UE-specific reference signal is disposed in resource elements according to a first antenna port, resource elements in which the UE-specific reference signal disposed according to a second antenna port is received may be set as zero-power. That is, a signal is not transmit in a resource element in which the UE-specific reference signal of another antenna port is transmitted.

The UE decodes the control channel or the data channel using the UE-specific reference signal. This is not limited to a specific channel transmitted within the sTTI, but includes all of channels transmitted within the sTTI.

Unlike an sTTI structure having three OFDM symbols, an sTTI structure having two OFDM symbols may achieve user plane latency of 1 ms although a control signal is transmitted in all of resources within the sTTI. Accordingly, there are hereinafter proposed a method for disposing a UE-specific reference signal for a case where a control signal is transmitted in all of resources within an sTTI and a method for disposing a UE-specific reference signal for a case where a control signal is transmitted only in the first OFDM symbol of an sTTI.

Figure 9:
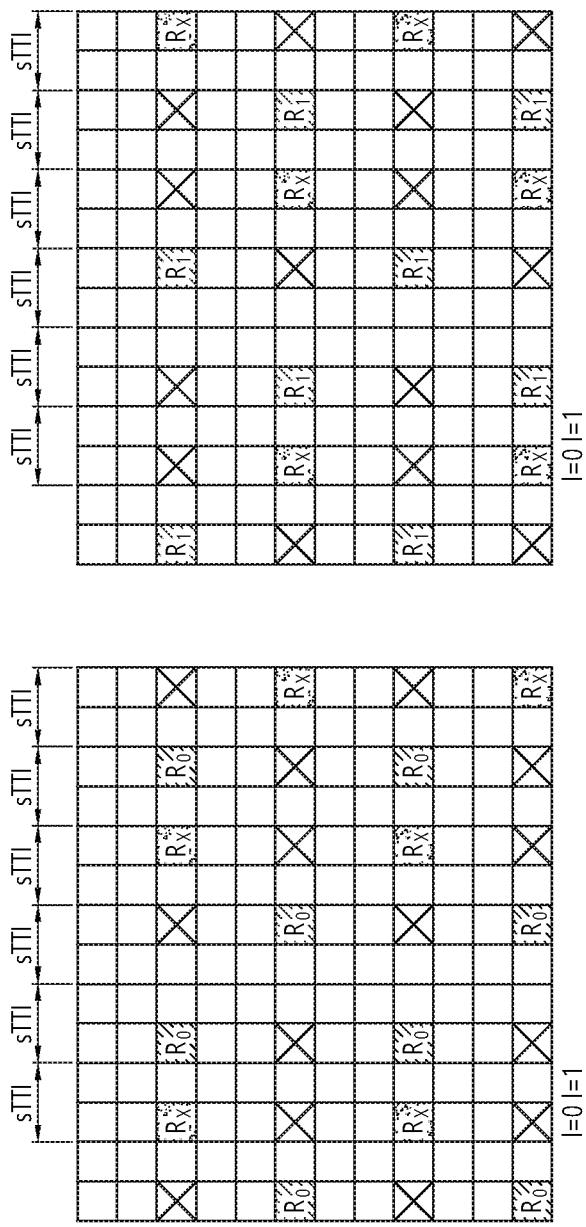
FIG. 9 shows an example of the UE-specific reference signal of an sTTI structure having two OFDM symbols.

FIG. 9 shows an example of the UE-specific reference signal of an sTTI structure having two OFDM symbols.

FIG. 9 shows a case where a control signal is transmitted in all of resources within an sTTI. In the sTTI structure having two OFDM symbols in FIG. 9, a resource mapping method for a UE-specific reference signal is as follows.

$$a_{k,l}^{(p)} = r(2 \cdot n_{PRB} + m') \qquad \text{Equation 3}$$

Parameters used in Equation 3 are as follows.

$$k = N_{SC}^{RB} \cdot n_{PRB} + 6 \cdot m' + (v + v_{shift}) \bmod 6 \qquad \text{Equation 4}$$

$$v = \begin{cases} 0 & \text{if } p = 0 \text{ and } n_{sTTI} = 5 \\ 3 & \text{if } p = 0 \text{ and } n_{sTTI} = 0, 3 \\ 0 & \text{if } p = 1 \text{ and } n_{sTTI} = 0, 3 \\ 3 & \text{if } p = 1 \text{ and } n_{sTTI} = 5 \\ \text{Null} & \text{if } n_{sTTI} = 1, 2, 4 \end{cases}$$

$$m' = 0, 1$$

$$l = \begin{cases} 0 & \text{if } n_{sTTI} = 0 \\ 1 & \text{if } n_{sTTI} = 3, 5 \\ \text{Null} & \text{if } n_{sTTI} = 1, 2, 4 \end{cases}$$

In Equation 4, "$n_{sTTI}$=0, 1, 2, 3, 4 or 5" refers to the index of an sTTI within a subframe. "1=0 or 1" refers to the index of an OFDM symbol within the sTTI. K is the index of a subcarrier. p is the index of an antenna port. mod means modular operation. In a frequency domain, the location of a reference signal depends on a value $V_{shift}$. The value $V_{shift}$ depends on a cell ID, and thus the location of the reference signal has a different frequency shift value in each cell.

FIG. 9 shows a form in which UE-specific reference signals are disposed according to Equation 3 and Equation 4. A figure on the left side of FIG. 9 shows the disposition of a CRS and a UE-specific reference signal if an antenna port is 0. A figure on the right side of FIG. 9 shows the disposition of a CRS and a UE-specific reference signal if an antenna port is 1.

An embodiment in which reference signals according to FIG. 9 are disposed and channel estimation is performed is described in detail below.

First, terms are summarized below. In this specification, a wireless communication system may be a system which performs communication using a subframe transmitted in a TTI. An sTTI is the time unit of resources temporally set to be shorter than that of a TTI. The wireless communication system may be a system in which a TTI and an sTTI coexist. Accordingly, a first cell-specific reference signal and a second cell-specific reference signal are received in a TTI, and a UE-specific reference signal is received in an sTTI. An sPDCCH received in the control region of an sTTI may become a control channel. An sPDSCH received in the data region of the sTTI may become a data channel. A symbol may include an OFDM symbol. A control signal may correspond to a control channel.

UE receives a control channel the first symbol of a plurality of symbols received for an sTTI. The first symbol may become a short Control Region (sCR), that is, the control region of the sTTI.

The UE receives a data channel scheduled by a control channel in the remaining symbols other than the first symbol of the plurality of symbols received for the sTTI. The remaining symbols may become a data region other than the control region of the plurality of symbols received for the sTTI.

The UE receives a UE-specific reference signal having the same frequency resources as a first cell-specific reference signal in the first symbol. The first cell-specific reference signal is received subsequent to the UE-specific reference signal. That is, the disposition of the UE-specific reference signal received in an sTTI may be different by taking into consideration the first cell-specific reference signal received in a TTI.

The reason why the frequency resource of the UE-specific reference signal is the same as that of the first cell-specific reference signal received subsequent to the UE-specific reference signal is that a relation with a second cell-specific reference signal received prior to the UE-specific reference signal is also taken into consideration. The UE-specific reference signal performs channel estimation on the control channel or the data channel within the sTTI through interpolation with the second cell-specific reference signal. That is, the optimum location of the UE-specific reference signal for performing interpolation with the previously received second cell-specific reference signal may be a location having the same frequency resources as that of the first cell-specific reference signal to be subsequently received. In this case, the second cell-specific reference signal may have a frequency resource different from that of the UE-specific reference signal on the basis that a diagonal direction pattern is performed.

Furthermore, the UE-specific reference signal is not received in symbols in which the first cell-specific reference signal and the second cell-specific reference signal are received. The reason for this is to minimize performance deterioration which may occur when channel estimation using the UE-specific reference signal is performed due to interference generated by the cell-specific reference signal of a neighbor cell. Furthermore, the reason for this is to constantly maintain the number of REs for the control channel of the first OFDM symbol within the sTTI.

Furthermore, multiple input multiple output (MIMO) precoding is not applied to the first cell-specific reference signal, the second cell-specific reference signal, and the UE-specific reference signal. MIMO precoding is not applied to the UE-specific reference signal because MIMO precoding is not applied to a CRS. If CRS MIMO precoding is applied, MIMO precoding may also be applied to the UE-specific reference signal.

Furthermore, transmission power for the UE-specific reference signal is the same as that for the data channel (or data).

Furthermore, if the UE-specific reference signal is disposed in resource elements according to a first antenna port, resource elements in which the UE-specific reference signal disposed according to a second antenna port is received may be set as zero-power. That is, a signal is not transmit in a resource element in which the UE-specific reference signal of another antenna port is transmitted.

The UE decodes the control channel or the data channel using the UE-specific reference signal. This is not limited to a specific channel transmitted within the sTTI, but includes all of channels transmitted within the sTTI.

Figure 10:
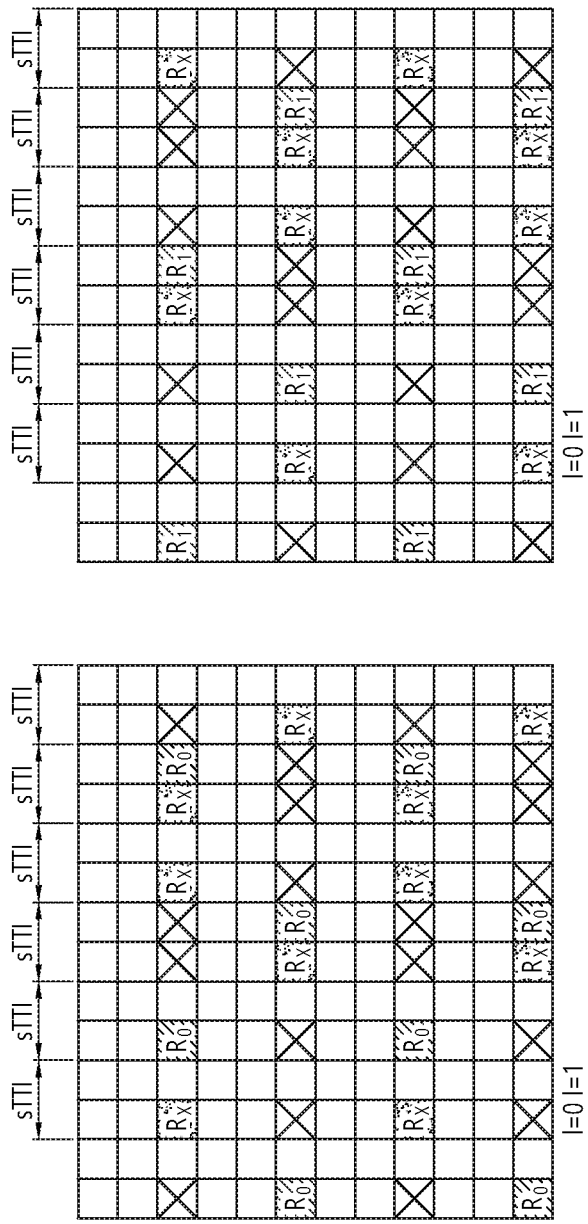
FIG. 10 shows another example of the UE-specific reference signal of an sTTI structure having two OFDM symbols.

FIG. 10 shows another example of the UE-specific reference signal of an sTTI structure having two OFDM symbols.

FIG. 10 shows a case where a control signal is transmitted only in the first OFDM symbol of an sTTI. In the sTTI structure having two OFDM symbols in FIG. 10, a resource mapping method for a UE-specific reference signal is as follows.

$$a_{k,l}^{(p)} = r(2 \cdot n_{PRB} + m') \qquad \text{Equation 5}$$

Parameters used in Equation 5 are as follows.

$$k = N_{SC}^{RB} \cdot n_{PRB} + 6 \cdot m' + (v + v_{shift}) \bmod 6 \qquad \text{Equation 6}$$

$$v = \begin{cases} 0 & \text{if } p = 0 \text{ and } n_{sTTI} = 2, 5 \\ 3 & \text{if } p = 0 \text{ and } n_{sTTI} = 0, 3, 4 \\ 0 & \text{if } p = 1 \text{ and } n_{sTTI} = 0, 3, 4 \\ 3 & \text{if } p = 1 \text{ and } n_{sTTI} = 2, 5 \\ \text{Null} & \text{if } n_{sTTI} = 1, 2, 4 \end{cases}$$

$$m' = 0, 1$$

$$l = \begin{cases} 0 & \text{if } n_{sTTI} = 0, 2, 3, 4, 5 \\ \text{Null} & \text{if } n_{sTTI} = 1 \end{cases}$$

In Equation 6, "$n_{sTTI}$=0, 1, 2 or 3" refers to the index of an sTTI within a subframe. "l=0, 1 or 2" refers to the index of an OFDM symbol within the sTTI. K is the index of a subcarrier. p is the index of an antenna port. mod means modular operation. In a frequency domain, the location of a reference signal depends on a value $V_{shift}$. The value $V_{shift}$ depends on a cell ID, and thus the location of the reference signal has a different frequency shift value in each cell.

FIG. 10 shows a form in which UE-specific reference signals are disposed according to Equation 5 and Equation 6. A figure on the left side of FIG. 10 shows the disposition of a CRS and a UE-specific reference signal if an antenna port is 0. A figure on the right side of FIG. 10 shows the disposition of a CRS and a UE-specific reference signal if an antenna port is 1.

An embodiment in which reference signals according to FIG. 10 are disposed and channel estimation is performed is described in detail below.

First, terms are summarized below. In this specification, a wireless communication system may be a system which performs communication using a subframe transmitted in a TTI. An sTTI is the time unit of resources temporally set to be shorter than that of a TTI. The wireless communication system may be a system in which a TTI and an sTTI coexist. Accordingly, a first cell-specific reference signal and a second cell-specific reference signal are received in a TTI, and a UE-specific reference signal is received in an sTTI. An sPDCCH received in the control region of an sTTI may become a control channel. An sPDSCH received in the data region of the sTTI may become a data channel. A symbol may include an OFDM symbol. A control signal may correspond to a control channel.

UE receives a control channel the first symbol of a plurality of symbols received for an sTTI. The first symbol may become a short Control Region (sCR), that is, the control region of the sTTI.

The UE receives a data channel scheduled by a control channel in the remaining symbols other than the first symbol of the plurality of symbols received for the sTTI. The remaining symbols may become a data region other than the control region of the plurality of symbols received for the sTTI.

The UE receives a UE-specific reference signal having the same frequency resources as a first cell-specific reference signal in the first symbol. The first cell-specific reference signal is received subsequent to the UE-specific reference signal. That is, the disposition of the UE-specific reference signal received in an sTTI may be different by taking into consideration the first cell-specific reference signal received in a TTI.

The reason why the frequency resource of the UE-specific reference signal is the same as that of the first cell-specific reference signal received subsequent to the UE-specific reference signal is that a relation with a second cell-specific reference signal received prior to the UE-specific reference signal is also taken into consideration. The UE-specific reference signal performs channel estimation on the control channel or the data channel within the sTTI through interpolation with the second cell-specific reference signal. That is, the optimum location of the UE-specific reference signal for performing interpolation with the previously received second cell-specific reference signal may be a location having the same frequency resources as that of the first cell-specific reference signal to be subsequently received. In this case, the second cell-specific reference signal may have a frequency resource different from that of the UE-specific reference signal on the basis that a diagonal direction pattern is performed.

Furthermore, the UE-specific reference signal is not received in symbols in which the first cell-specific reference signal and the second cell-specific reference signal are received. The reason for this is to minimize performance deterioration which may occur when channel estimation using the UE-specific reference signal is performed due to interference generated by the cell-specific reference signal of a neighbor cell. Furthermore, the reason for this is to constantly maintain the number of REs for the control channel of the first OFDM symbol within the sTTI.

Furthermore, multiple input multiple output (MIMO) precoding is not applied to the first cell-specific reference signal, the second cell-specific reference signal, and the UE-specific reference signal. MIMO precoding is not applied to the UE-specific reference signal because MIMO precoding is not applied to a CRS. If CRS MIMO precoding is applied, MIMO precoding may also be applied to the UE-specific reference signal.

Furthermore, transmission power for the UE-specific reference signal is the same as that for the data channel (or data).

Furthermore, if the UE-specific reference signal is disposed in resource elements according to a first antenna port, resource elements in which the UE-specific reference signal disposed according to a second antenna port is received may be set as zero-power. That is, a signal is not transmit in a resource element in which the UE-specific reference signal of another antenna port is transmitted.

The UE decodes the control channel or the data channel using the UE-specific reference signal. This is not limited to a specific channel transmitted within the sTTI, but includes all of channels transmitted within the sTTI.

Figure 11:
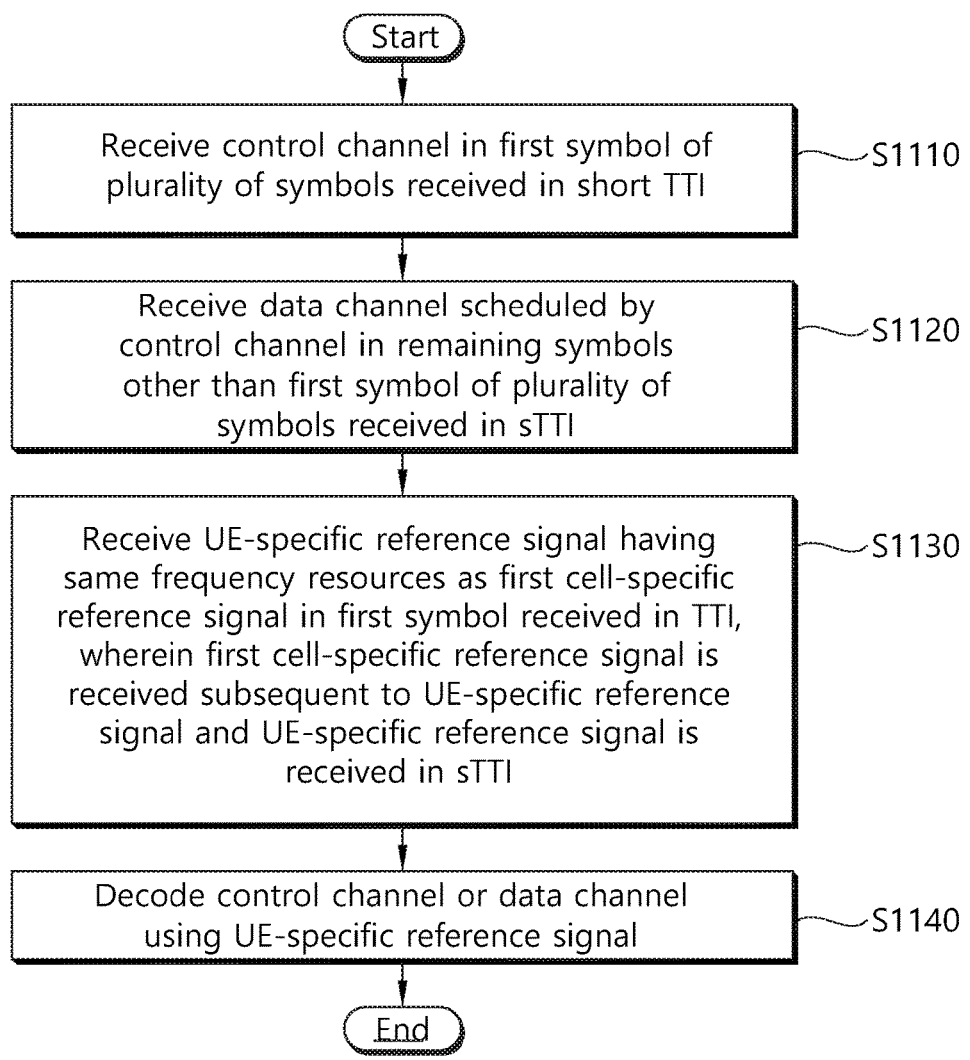
FIG. 11 is a flowchart illustrating a procedure for performing channel estimation in a wireless communication system according to an embodiment of this specification.

FIG. 11 is a flowchart illustrating a procedure for performing channel estimation in a wireless communication system according to an embodiment of this specification.

First, terms are summarized below. In this specification, a wireless communication system may be a system which performs communication using a subframe transmitted in a TTI. An sTTI is the time unit of resources temporally set to be shorter than that of a TTI. The wireless communication system may be a system in which a TTI and an sTTI coexist. Accordingly, a first cell-specific reference signal and a second cell-specific reference signal are received in a TTI, and a UE-specific reference signal is received in an sTTI. An sPDCCH received in the control region of an sTTI may become a control channel. An sPDSCH received in the data region of the sTTI may become a data channel. A symbol may include an OFDM symbol.

At step S1110, UE receives a control channel in the first symbol of a plurality of symbols received for an sTTI. The first symbol may become a short Control Region (sCR), that is, the control region of the sTTI.

At step S1120, the UE receives a data channel scheduled by the control channel in the remaining symbols other than the first symbol of the plurality of symbols received for the sTTI. The remaining symbols may become a data region other than the control region of the plurality of symbols received for the sTTI.

At step S1130, the UE receives a UE-specific reference signal having the same frequency resources as a first cell-specific reference signal in the first symbol. The first cell-specific reference signal is received subsequent to the UE-specific reference signal. That is, the disposition of the UE-specific reference signal received in an sTTI may be different depending on the first cell-specific reference signal received in a TTI.

The reason why the frequency resource of the UE-specific reference signal is the same as that of the first cell-specific reference signal received subsequent to the UE-specific reference signal is that a relation with a second cell-specific reference signal received prior to the UE-specific reference signal is also taken into consideration. That is, the second cell-specific reference signal is received prior to the sTTI in which the UE-specific reference signal is received. The UE-specific reference signal performs channel estimation on the control channel or the data channel within the sTTI through interpolation with the second cell-specific reference signal. That is, the optimum location of the UE-specific reference signal for performing interpolation with the second cell-specific reference signal that is previously received may be a location having the same frequency resources as that of the first cell-specific reference signal that is to be subsequently received. In this case, the second cell-specific reference signal may have a frequency resource different from that of the UE-specific reference signal on the basis that the second cell-specific reference signal has a pattern performed in a diagonal direction.

At step S1140, the UE decodes the control channel or the data channel using the UE-specific reference signal. This is not limited to a specific channel transmitted within the sTTI, but includes all of channels transmitted within the sTTI.

Figure 12:
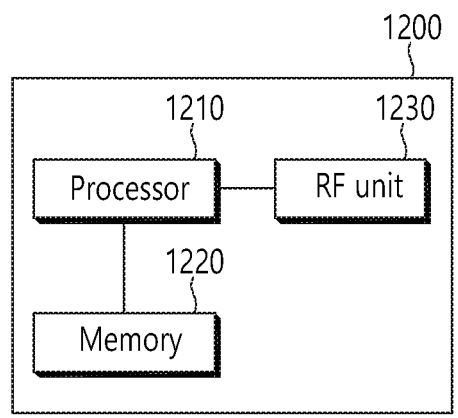
FIG. 12 is a block diagram showing an apparatus for wireless communication for implementing an embodiment of the present invention.

FIG. 12 is a block diagram showing an apparatus for wireless communication for implementing an embodiment of the present invention.

An apparatus 1200 for wireless communication includes a processor 1210, a memory 1220 and a radio frequency (RF) unit 1230.

The processor 1210 may be configured to implement proposed functions, procedures and/or methods described in this description. Layers of the radio interface protocol may be implemented in the processor 1210. The processor 1210 may handle a procedure explained above. The memory 1220 is operatively coupled with the processor 1210, and the RF unit 1230 is operatively coupled with the processor 1210.

The processor 1210 may include application-specific integrated circuit (ASIC), other chipset, logic circuit and/or data processing device. The memory 1220 may include read-only memory (ROM), random access memory (RAM), flash memory, memory card, storage medium and/or other storage device. The RF unit 1230 may include baseband circuitry to process radio frequency signals. When the embodiments are implemented in software, the techniques described herein can be implemented with modules (e.g., procedures, functions, and so on) that perform the functions described herein. The modules can be stored in memory 1220 and executed by processor 1210. The memory 1220 can be implemented within the processor 1210 or external to the processor 1210 in which case those can be communicatively coupled to the processor 1210 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for receiving, by a user equipment (UE), downlink signals in a wireless communication system using a subframe transmitted in a transmission time interval (TTI), the method comprising:

receiving a control channel in a first symbol of a plurality of symbols received in a short TTI (sTTI) set to be shorter than the TTI;

receiving a data channel scheduled by the control channel in remaining symbols other than the first symbol of the plurality of symbols received in the sTTI;

receiving, in the first symbol, a user equipment (UE)-specific reference signal having a frequency resource identical with a frequency resource of a first cell-specific reference signal received in the TTI, wherein the first cell-specific reference signal is received subsequent to the UE-specific reference signal, and wherein the UE-specific reference signal is received in the sTTI;

decoding the control channel or the data channel using the UE-specific reference signal, and performing channel estimation on the control channel or the data channel through interpolation between the UE-specific reference signal and a second cell-specific reference signal received prior to the sTTI in which the UE-specific reference signal is received.

2. The method of claim 1,
wherein the second cell-specific reference signal is received in the TTI, and
wherein the second cell-specific reference signal has a frequency resource different from the frequency resource of the UE-specific reference signal.

3. The method of claim 2, wherein the UE-specific reference signal is not received in a symbol in which the first cell-specific reference signal and the second cell-specific reference signal are received.

4. The method of claim 2, wherein multiple input multiple output (MIMO) precoding is not applied to the first cell-specific reference signal, the second cell-specific reference signal, and the UE-specific reference signal.

5. The method of claim 1, wherein transmission power for the UE-specific reference signal is identical with transmission power for the data channel.

6. The method of claim 1, wherein:
the UE-specific reference signal is mapped to a first resource element using a first antenna port, and
transmission power for a UE-specific reference signal mapped to a second resource element using a second antenna port is set to zero.

7. A user equipment (UE) for receiving downlink signals in a wireless communication system using a subframe transmitted in a transmission time interval (TTI), the UE comprising:

a radio frequency (RF) unit that transmits and receives a radio signal; and a processor connected to the RF unit, wherein the processor is configured to:

receive a control channel in a first symbol of a plurality of symbols received in a short TTI (sTTI) set to be shorter than the TTI;

receive a data channel scheduled by the control channel in remaining symbols other than the first symbol of the plurality of symbols received in the sTTI;

receive, in the first symbol, a user equipment (UE)-specific reference signal having a frequency resource identical with a frequency resource of a first cell-specific reference signal received in the TTI, wherein the first cell-specific reference signal is received subsequent to the UE-specific reference signal, and wherein the UE-specific reference signal is received in the sTTI;

decode the control channel or the data channel using the UE-specific reference signal, and perform channel estimation on the control channel or the data channel through interpolation between the UE-specific reference signal and a second cell-specific reference signal received prior to the sTTI in which the UE-specific reference signal is received.

8. The UE of claim 7,
wherein the second cell-specific reference signal is received in the TTI, and
wherein the second cell-specific reference signal has a frequency resource different from the frequency resource of the UE-specific reference signal.

9. The UE of claim 8, wherein the UE-specific reference signal is not received in a symbol in which the first cell-specific reference signal and the second cell-specific reference signal are received.

10. The UE of claim 8, wherein multiple input multiple output (MIMO) precoding is not applied to the first cell-specific reference signal, the second cell-specific reference signal, and the UE-specific reference signal.

11. The UE of claim 7, wherein transmission power for the UE-specific reference signal is identical with transmission power for the data channel.

12. The UE of claim 7, wherein:
the UE-specific reference signal is mapped to a first resource element using a first antenna port, and
transmission power for a UE-specific reference signal mapped to a second resource element using a second antenna port is set to zero.

13. A method for transmitting, by a base station, downlink signals in a wireless communication system using a subframe transmitted in a transmission time interval (TTI), the method comprising:
transmitting a control channel in a first symbol of a plurality of symbols received in a short TTI (sTTI) set to be shorter than the TTI;
transmitting a data channel scheduled by the control channel in remaining symbols other than the first symbol of the plurality of symbols received in the sTTI;
transmitting, in the first symbol, a user equipment (UE)-specific reference signal having a frequency resource identical with a frequency resource of a first cell-specific reference signal received in the TTI, wherein the first cell-specific reference signal is transmitted subsequent to the UE-specific reference signal, and wherein the UE-specific reference signal is transmitted in the sTTI, and
performing channel estimation on the control channel or the data channel through interpolation between the UE-specific reference signal and a second cell-specific reference signal transmitted prior to the sTTI in which the UE-specific reference signal is transmitted.

14. The method of claim 13, wherein:
the control channel or the data channel is decoded using the UE-specific reference signal,
the second cell-specific reference signal is transmitted in the TTI, and
the second cell-specific reference signal has a frequency resource different from the frequency resource of the UE-specific reference signal.

15. The method of claim 14, wherein the UE-specific reference signal is not transmitted in a symbol in which the first cell-specific reference signal and the second cell-specific reference signal are transmitted.

16. The method of claim 14, wherein multiple input multiple output (MIMO) precoding is not applied to the first cell-specific reference signal, the second cell-specific reference signal, and the UE-specific reference signal.

17. The method of claim 13, wherein transmission power for the UE-specific reference signal is identical with transmission power for the data channel.

18. The method of claim 13, wherein:
the UE-specific reference signal is mapped to a first resource element using a first antenna port, and
transmission power for a UE-specific reference signal mapped to a second resource element using a second antenna port is set to zero.

* * * * *